(12) United States Patent
Sohn et al.

(10) Patent No.: US 7,648,762 B2
(45) Date of Patent: Jan. 19, 2010

(54) ANTIBACTERIAL AND ANTI-STATIC MULTIFUNCTIONAL HARD COATING COMPOSITION

(75) Inventors: Ho Seok Sohn, Gunpo-si (KR); Hyun Don Kim, Anyang-si (KR); Dong Il Shin, Gunpo-si (KR); Young Gak Joung, Seoul (KR)

(73) Assignee: Cheil Industries, Inc., Gumi-shi, Gyungsangbuk-do (KR)

( * ) Notice: Subject to any disclaimer, the term of this patent is extended or adjusted under 35 U.S.C. 154(b) by 182 days.

(21) Appl. No.: 11/514,614

(22) Filed: Aug. 31, 2006

(65) Prior Publication Data

US 2007/0173564 A1    Jul. 26, 2007

(30) Foreign Application Priority Data

Dec. 29, 2005    (KR) .................. 10-2005-0133701

(51) Int. Cl.
*B32B 5/16*   (2006.01)
*B32B 19/00*  (2006.01)
*B32B 27/02*  (2006.01)

(52) U.S. Cl. ................. 428/327; 428/331; 428/357; 428/402; 428/403; 428/407

(58) Field of Classification Search .......... None
See application file for complete search history.

(56) References Cited

U.S. PATENT DOCUMENTS 6,004,483 A    12/1999  Jonas et al.
6,355,406 B2   3/2002   Majumdar et al.
6,358,437 B1   3/2002   Jonas et al.
7,329,301 B2 * 2/2008   Chang et al. ............... 75/252
7,348,365 B2 * 3/2008   Lee et al. .................. 516/78

FOREIGN PATENT DOCUMENTS

| EP | 0 999 242 A1 | 5/2000 |
| JP | 57-074369 | 5/1982 |
| JP | 58-500251 | 2/1983 |
| JP | 5-186534 | 7/1993 |
| JP | 5-214044 | 8/1993 |
| JP | 5-214045 | 8/1993 |
| JP | 9-012968 | 1/1997 |
| JP | 2001-081413 | 3/2001 |
| JP | 2003-268316 | 9/2003 |
| KR | 10-2001-0058446 | 7/2001 |
| WO | WO 82/02403 | 7/1982 |

* cited by examiner

*Primary Examiner*—Sheeba Ahmed
(74) *Attorney, Agent, or Firm*—Lee & Morse, P.C.

(57) ABSTRACT

A hard coating composition that can be coated on a transparent plastic substrate is disclosed. The hard coating composition includes (a) a silver nanoparticle sol, (b) a conductive filler, (c) a photocurable resin, (d) a photopolymerization initiator, and (e) an organic solvent. The composition has a viscosity of about 5 to 100 cps. The silver nanoparticle sol includes a plurality of silver nanoparticles. The plurality of silver nanoparticles has a diameter between about 1 nm and about 10 nm.

21 Claims, 2 Drawing Sheets

ANTIBACTERIAL AND ANTI-STATIC MULTIFUNCTIONAL HARD COATING COMPOSITION

CROSS-REFERENCE TO RELATED APPLICATIONS

This application claims priority to and the benefit of Korean Patent Application No. 10-2005-133701, filed on Dec. 29, 2005 in the Korean Intellectual Property Office, the disclosure of which is incorporated herein by reference in its entirety.

BACKGROUND OF THE INVENTION

1. Field

The present invention relates to a hard coating composition. More particularly, the present invention relates to a hard coating composition that provides superior antibacterial properties, anti-fouling functions and anti-static properties, and other improved physical properties such as surface resistivity, transparency, hardness and scratch resistance.

2. Description of the Related Technology

In general, functional hard coating materials have been widely used to protect a variety of products in the fields of construction parts and exterior decorative parts for automobiles, paper, lumber, furniture, soundproofing walls, optical materials, cosmetic containers and display devices. With recent advances in display devices, including LCDs, PDPs and projection TVs, there has been an increased demand for a functional hard coating material for protecting the surface of these display devices. In addition, a hard coating material has been widely used for household appliances and portable electronic devices for preventing scratches on their surfaces. A hard coating material may also be used for walls of a clean room for semiconductor processing.

Japanese Patent Application Publication No. Hei 5-214044 discloses a hard coating composition. The composition comprises a poly-functional monomer containing three or more (meth)acryloyl groups, and a mono- or bi-functional acrylic monomer. The acrylic monomer is selected from the group consisting of polyethylene glycol methacrylate, polyoxyethylene glycol acrylate, polyethylene glycol methacrylate and polypropylene glycol methacrylate.

Japanese Patent Application Publication No. Hei 5-214045 discloses another coating solution composition. The composition comprises a polyfunctional monomer containing three or more (meth)acryloyl groups, and an acrylic monomer selected from the group consisting of polyethylene glycol methacrylate, polyethylene glycol dimethacrylate, polyethylene trimethacrylate and polyoxyethylene glycol tetramethacrylate.

Further, Japanese Patent Application Publication No. Hei 5-186534 discloses a UV-curable hard coating composition. The composition comprises a phosphoric ester having acryloyl or (meth)acryloyl group, an organic compound having at least one UV-curable functional group and at least one tertiary amine group in the molecule, and an organic compound having at least two active ethylene groups in the molecule.

Since most of the above hard coating compositions have been developed mainly for improving the scratch resistance of hard coatings, they do not have anti-static functions. In some hard coating compositions having anti-static functions, a component for the anti-static functions is an ionically-conductive material simply added to the hard coating compositions without binding to a matrix. Thus, the anti-static functions of the hard coating compositions do not last a long period of time.

In addition, since the hard coating has a low surface hardness of about 3H to 4H (pencil hardness), numerous attempts have been made to increase the surface hardness of the hard coating. For example, Japanese Patent Application Publication No. 57-074369 discloses a coating composition comprising a polyfunctional acrylate monomer as a photocurable resin, an inorganic filler powder and a polymerization initiator. Further, Japanese Patent Application Publication No. 58-500251 discloses a photopolymerizable composition comprising an inorganic filler material consisting of surface-treated silica or alumina. However, these compositions fail to satisfy the recent requirement for a high surface hardness of hard coatings.

The above-described hard coating compositions and transparent hard coating sheets using the hard coating compositions do not sufficiently satisfy the requirements for high functionality and various physical properties according to recent advances in display devices and other devices, e.g., cell phones. Thus, there is a need to provide a hard coating composition that has superior anti-fouling functions and anti-static properties, exhibits various improved physical properties, including surface resistivity, transparency and scratch resistance, and produces no pollutants.

The discussion in this section is to provide information about related technology and does not constitute an admission of prior art.

SUMMARY

One aspect of the invention provides a composition for coating on a surface. The composition comprises: a conductive filler; a binder comprising a polymerizable compound; a polymerization initiator; an organic solvent; and a plurality of silver nanoparticles dispersed in the composition, wherein the composition has a viscosity of about 5 to 100 cps.

The plurality of silver nanoparticles may have a diameter between about 1 nm and about 4 nm. The plurality of silver nanoparticles may have a diameter between about 6 nm and about 10 nm. At least one of the silver nanoparticles may comprise an insulating material coating the surface thereof.

The insulating material may comprise a silicon-based compound. The silicon-based compound may comprise silicon dioxide. The insulating material may comprise polyvinylpyrrolidone. The at least one of the silver nanoparticles may further comprise a silane coupling agent on the surface thereof. The substantially entire surface of the at least one of the silver nanoparticles may be covered with the insulating material.

The binder may further comprise an oligomer and/or a polymer. The polymerizable compound may comprise a photo-curable compound or a heat-curable compound.

Another aspect of the invention provides an article comprising a coated surface, the coated surface comprising a coated layer. The coated layer comprises: a conductive filler; a binder comprising a polymerizable compound; a polymerization initiator; and a plurality of silver nanoparticles substantially uniformly dispersed in the layer, at least one of the silver nanoparticles comprising an insulating material coating the surface thereof.

The insulating material may comprise a silicon-based compound. The silicon-based compound may comprise silicon dioxide. The insulating material may comprise polyvinylpyrrolidone. The at least one of the silver nanoparticles may further comprise a silane coupling agent on the surface thereof. The substantially entire surface of the at least one of the silver nanoparticles may be covered with the insulating material.

The article may comprise an electronic device. The article may comprise a coating for rooms inside a building. The coated layer may have a bactericidal power of about 99% or greater after culturing *Staphylococcus aureua* and *Esherichia coli* for 24 hours on the surface thereof.

Another aspect of the invention provides a hard coating composition comprising (a) a silver nanoparticle sol, (b) a conductive filler, (c) a photocurable resin, (d) a photopolymerization initiator, and (e) an organic solvent.

Yet another aspect of the invention provides a method for coating the hard coating composition, the method comprising the steps of applying the hard coating composition to a transparent plastic substrate, drying the transparent plastic substrate, and irradiating the transparent plastic substrate with UV light.

Another aspect of the invention provides a transparent hard coating sheet produced using the hard coating composition.

BRIEF DESCRIPTION OF THE DRAWINGS

The above and other objects, features and other advantages of the invention will be more clearly understood from the following detailed description taken in conjunction with the accompanying drawings, in which.

DETAILED DESCRIPTION

Embodiments of the invention are described in detail below with reference to the accompanying drawings. These embodiments do not serve to limit the invention, but are set forth for illustrative purposes. The scope of the invention is defined by the claims that follow.

Figure 1:
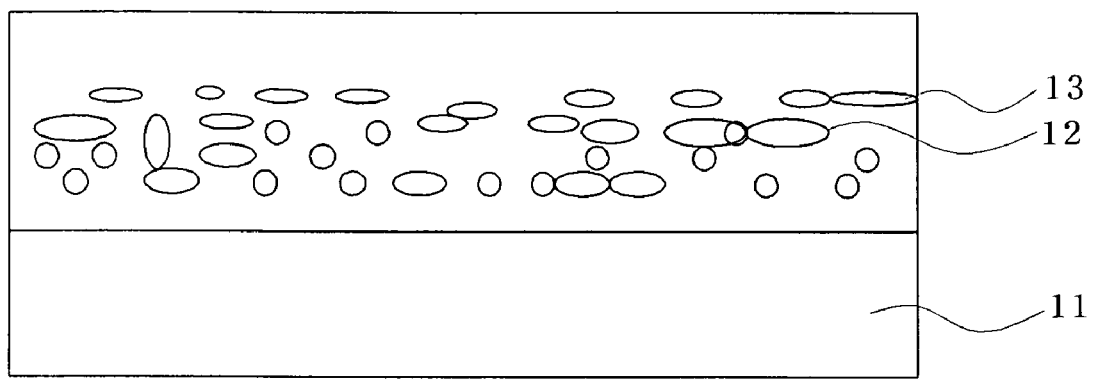
FIG. 1 is a schematic cross-sectional view showing the structure of a transparent hard coating sheet produced by coating with a conventional hard coating composition.

A hard coating composition using an electrically conductive sol of a metal oxide, e.g., ITO or ATO, has been developed to impart anti-static and electromagnetic wave shielding functions to a hard coating. FIG. 1 is a cross-sectional view schematically showing the structure of a transparent hard coating sheet coated with the hard coating composition.

As shown in FIG. 1, the transparent hard coating sheet comprises a transparent plastic substrate 11 and a hard coating formed on the transparent plastic substrate 11. The hard coating has metal oxide particles 13 dispersed in an acrylic monomer or oligomer 12. The anti-static functions of the hard coating are maintained for a relatively long period of time due to the charge transfer of free electrons.

However, since the hard coating formed on the transparent plastic substrate 11 has a transmittance as low as about 80 to about 85% and has a blue color tone, the appearance of the transparent plastic substrate 11 is disadvantageously spoiled. In addition, the metal oxide particles 13 aggregate and micro cracks are formed on the surface of the hard coating with the passage of time, resulting in the discharge of inorganic materials, such as the metal oxide particles 13, as pollutants. For these reasons, the transparent plastic substrate 11 may whiten. In addition, a clean room to which the transparent hard coating sheet is applied may become contaminated, and introduction of impurities from the outside may not be blocked. Accordingly, anti-fouling functions cannot be sufficiently provided. Furthermore, the storage stability of the hard coating composition decreases drastically. Moreover, since the hard coating composition is expensive, the price of plastic products using the hard coating composition increases, making the hard coating composition unsuitable for commercialization.

In one embodiment, a hard coating composition includes a conductive filler, a binder, a polymerization initiator, an organic solvent, and a plurality of silver nanoparticles dispersed in the composition. The conductive filler may be a conductive polymer. The binder may include a polymerizable compound which is photo- or heat-curable. The polymerization initiator may be a photo or heat polymerization initiator depending on the type of the polymerization compound. In one embodiment, the hard coating composition has a viscosity of about 5 to 100 cps. In some embodiments, the silver nanoparticles have an insulating material coating the surface thereof.

In one embodiment, a hard coating composition includes a silver nanoparticle sol, a conductive filler, a photocurable resin, a photopolymerization initiator, and an organic solvent. The inventors have found that since the hard coating composition exhibits various improved physical properties, including surface resistivity, transparency, hardness and scratch resistance, it can be used to form a hard coating suitable for a variety of display devices. The conductive filler used in the hard coating composition provides anti-static functions to a hard coating. In particular, the conductive filler may bind to the photocurable resin, etc. within the hard coating.

Accordingly, the hard coating composition including the conductive filler has superior anti-static properties and can be used to form a hard coating that has virtually no deterioration in anti-static functions for a long period of time. Further, the hard coating has little or no risk of producing various kinds of pollutants, and exhibit superior anti-fouling functions, effectively blocking introduction of moisture in the air and impurities from the outside. Further, the silver nanoparticle sol used in the hard coating composition allows the hard coating to have superior antibacterial properties. The components of the hard coating composition are explained in detail below.

The hard coating composition includes a silver nanoparticle sol. The silver nanoparticle sol allows a hard coating to have improved hardness and wear resistance as well as superior antibacterial properties. The silver nanoparticle sol in the hard coating composition has a colloidal state. The silver nanoparticle sol inhibits the survival and growth of microbes in the hard coating.

In one embodiment, the silver nanoparticle sol contains silver nanoparticles having an average particle diameter of about 1 nm to about 10 nm. In another embodiment, the silver nanoparticles have an average particle diameter of about 1 nm to about 4 nm. In yet another embodiment, the silver nanoparticles have an average particle diameter of about 6 nm to about 10 nm. The silver nanoparticle sol may contain silver nanoparticles in an amount from about 0.1 wt % to about 1.0 wt % with reference to the weight of the silver nanoparticle sol. By the addition of such a silver nanoparticle sol, improvements in antibacterial properties, wear resistance and hardness can be maximized.

In another embodiment, the silver nanoparticle sol may contain silver nanoparticles coated with an insulating material. Examples of the insulating material include, but are not limited to, a silicon-based compound and a polymeric compound.

Figure 3:
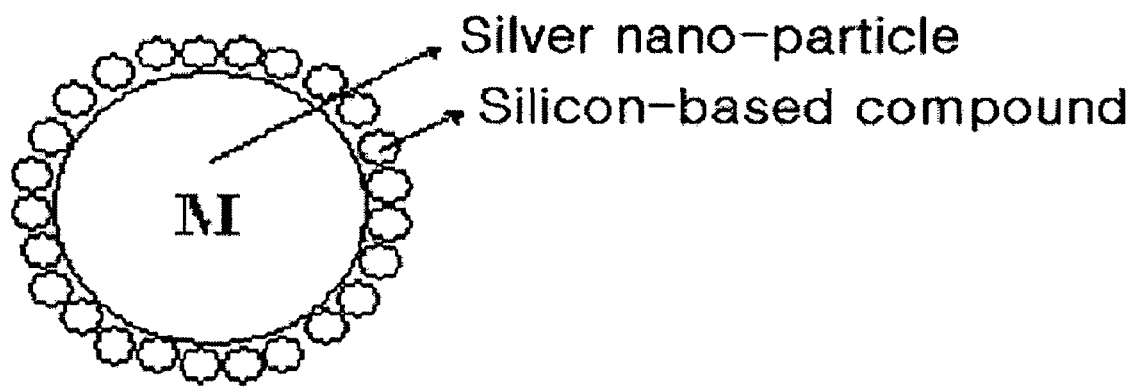
FIG. 3 is a schematic view showing the shape of a silver nanoparticle used in a hard coating composition according to one embodiment.

An exemplary silicon-based compound may be amorphous silicon oxide. Referring to FIG. 3, a silver nanoparticle is coated with particles of the silicon-based compound. The silicon-based compound may have an average particle diameter of about 0.1 to about 1 nm so that it can be effectively coated on the silver nanoparticles having an average particle diameter of about 1 to about 10 nm. In one embodiment, the silicon-based compound may be coated on the surfaces of the silver nanoparticles, using a silane coupling agent. The silicon-based compound may be coated on the nanoparticles through a sol-gel process. The silicon-based compound improves the stability of the silver nanoparticles in the air or under UV irradiation and the dispersion stability of the silver nanoparticles in the hard coating composition.

In other embodiments, the silver nanoparticles may be coated with a polymeric compound. An exemplary polymeric insulating material is polyvinylpyrrolidone.

The hard coating composition also includes a conductive filler. The conductive filler used in the hard coating composition imparts anti-static functions to a hard coating formed using the hard coating composition. The conductive filler may include any suitable polymeric materials so long as they are electrically conductive. Examples of the conductive filler include, but are not limited to, polyanilines, polypyrroles, and polythiophenes.

The conductive filler contains no metal or inorganic component. Neither does the conductive filler include a metal oxide, e.g., ITO or ATO. The conductive filler may bind to the photocurable resin, etc. within the hard coating. Accordingly, the conductive filler can minimize a decrease in the anti-static functions of the hard coating with the passage of time and production of various pollutants. In addition, since the conductive filler can effectively block introduction of moisture in the air or impurities from the outside, and thus allows the hard coating to exhibit superior anti-fouling functions.

In one embodiment, the conductive filler is a polythiophene polymer. The polythiophene polymer is inexpensive and shows excellent thermal stability, UV stability and processibility, compared to other conductive polymers.

The polythiophene polymer may be a polymer including poly(3,4-dialkoxythiophene) and a polyanion. In another embodiment, the polythiophene polymer may include poly (3,4-ethylenedioxythiophene)-poly(styrenesulfonate). The polythiophene polymer may include, without limitation, any polythiophene polymers that are electrically conductive. The conductive filler may be in an amount of about 0.01 to about 10% by weight with reference to the weight of the hard coating composition.

For ease of dispersion, a polymeric solution (solid content: about 1.3 wt % to about 1.5 wt %) including the conductive filler and an organic solvent is used.

The hard coating composition also includes a photocurable resin. The photocurable resin used in the hard coating composition may contain at least one kind of acrylic monomers. The double bonds of an acrylic monomer contained in the photocurable resin are broken by catalytic activity of the photopolymerization initiator to initiate a cross-linking reaction, enabling formation of a well-cured hard coating.

The photocurable resin may contain at least one kind of mono-, bi- and tri-functional acrylic monomers, and at least one kind of tetra- and higher functional acrylic monomers. For example, if a tetra- or higher functional acrylic monomer is used alone, high curing rate and high hardness of a hard coating can be achieved, but the impact resistance, wear resistance and flexibility of the hard coating are disadvantageously deteriorated. In contrast, the use of a mono-, bi- or tri-functional acrylic monomer alone contributes to an improvement in the flexibility of the hard coating, but retards the curing of the hard coating and lowers the hardness of the hard coating. For these reasons, the combined use of the tetra- or higher functional acrylic monomer and the mono-, bi- or tri-functional acrylic monomer in the photocurable resin is advantageous because the impact resistance, flexibility, peeling resistance, hardness, and curing properties of a hard coating can be optimized. These optimized physical properties are attributed to the coexistence of high-density cross-linking bonds and low-density cross-linking bonds after formation of a hard coating. Thus, the hard coating has both durability and flexibility.

The mono-, bi- and tri-functional acrylic monomers include those known in the industry. Examples of monofunctional acrylic monomers include, but are not limited to, butyl acrylate, allyl methacrylate, 2-methoxyethyl acrylate, 2-hydroxyethyl methacrylate, and 2-hydroxyethyl acrylate. Examples of bi-functional acrylic monomers include, but are not limited to, 1,6-hexanediol diacrylate (HDDA), 1,3-butylene glycol dimethacrylate (BGMDA), and tripropylene glycol diacrylate (TPGDA). Examples of tri-functional acrylic monomers include, but are not limited to, trimethylolpropane triacrylate (TMPTA) and pentaerythritol triacrylate (PETA). Examples of tetra- and higher functional acrylic monomers include, but are not limited to, dipentaerythritol hexaacrylate (DPHA).

The photocurable resin may further include a fluorinated acrylic monomer or urethane acrylic monomer or oligomer as another acrylic monomer. The monomer or oligomer controls the viscosity of the hard coating composition and improves the anti-fouling functions of the hard coating.

The hard coating composition also comprises a photopolymerization initiator. The photopolymerization initiator used in the hard coating composition produces free radicals upon UV irradiation. The free radicals act to break the double bonds of the acrylic monomer contained in the photocurable resin to initiate a cross-linking reaction.

The photopolymerization initiator includes any suitable photopolymerization initiators known in the industry. Examples of photopolymerization initiators include, but are not limited to, 1-hydroxy-cyclohexyl-phenyl ketone (Irgacure-184 available from Ciba Specialty Chemicals Inc, Switzerland), $\alpha,\alpha$-dimethoxy-$\alpha$-hydroxy acetophenone (Darocure 1173 available from Ciba Specialty Chemicals Inc, Switzerland), benzophenone-based materials, e.g., blends of 1-hydroxy-cyclohexyl-phenyl ketone benzophenone, and 2-hydroxy-2-methyl-1-phenyl propane.

The hard coating composition also includes an organic solvent. The organic solvent used in the hard coating composition dissolves the other components of the hard coating composition, particularly the photocurable resin. The organic solvent adjusts the flowability of the hard coating composition.

Taking into consideration the coatability and drying rate of the hard coating composition and the appearance and production yield of the final product, one skilled in the art will be able to select suitable multiple organic solvents to prepare a mixed solvent.

The organic solvent includes, but is not limited to, at least one solvent selected from methanol, ethanol, isopropanol, n-propanol, butanol, isobutanol, ethylcellosolve, methylcellosolve, butylcellosolve, butyl acetate, ethyl acetate, diacetone alcohol, methyl ethyl ketone, propylene glycol isopropyl alcohol, and ethylene glycol isopropyl alcohol.

The hard coating composition may further include a light stabilizer. The light stabilizer is added to improve the photostability of a hard coating so that changes in physical properties or anti-static properties, etc. over time can be prevented. A skilled artisan will be able to select a suitable light stabilizers based on the kind of the photopolymerization initiator. For example, when the photopolymerization initiator is a benzophenone-based material, e.g., α,α-dimethoxy-α-hydroxyacetophenone (Darocure 1173), the light stabilizer may be bis-(1-octyloxy-2,2,6,6-tetramethyl-4-piperidinyl) (Tinubin 123 available from Ciba Geigy, Switzerland). Further, any other suitable light stabilizers may be used for the photopolymerization initiator.

Some of photopolymerization initiators may exhibit light stabilizing functions together with their inherent functions. In this case, the addition of the light stabilizer may be omitted.

The hard coating composition may further include at least one additive selected from the group consisting of leveling agents, UV absorbers, surfactants and other additives that are known to those skilled in the art.

In one embodiment, the hard coating composition has a viscosity of about 5 to about 100 cps at about 25° C. Within this range, the hard coating composition has better flowability and thus the workability in the formation of a hard coating can be improved.

The hard coating composition may include about 1 to about 10% by weight of the silver nanoparticle sol, about 0.01 and about 10% by weight of the conductive filler, about 10 to about 50% by weight of the photocurable resin, about 1 to about 5% by weight of the photopolymerization initiator, and the balance of the organic solvent. The hard coating composition may further include about 0.02 to about 1.0% by weight of the light stabilizer based on the total weight of the composition.

According to the embodiments described above, the antibacterial properties, anti-fouling functions, antistatic properties, surface resistivity, hardness, transparency and scratch resistance, etc. of a hard coating can be optimized, and the workability in the formation of the hard coating can be improved.

The hard coating composition can be prepared by mixing together the components described above.

A method for coating the hard coating composition according to one embodiment is provided. The method includes the steps of applying the hard coating composition to a transparent plastic substrate, drying the transparent plastic substrate, and irradiating the transparent plastic substrate with UV light.

The coating method can apply to a transparent plastic substrate including a material such as polycarbonate, polymethylmethacrylate, polyvinylchloride, methylmethacrylate-styrene copolymer, and ABS resins. The transparent plastic substrate may have a thickness of about 0.4 to about 6 mm depending on the intended applications.

According to the coating method, before the application of the composition, the transparent plastic substrate can be sufficiently washed and preheated using a UV radiator to remove oil and impurities remaining on the substrate.

Thereafter, the viscosity of the hard coating composition is controlled within the range of about 5 to about 100 cps at about 25° C. before the application of the composition to the transparent plastic substrate. The hard coating composition can be applied to the substrate by various coating techniques, such as dip coating, flow coating, spray coating, roll coating and gravure coating.

After completion of the application, the transparent plastic substrate is dried at a temperature of about 40 to about 80° C. for about 1 to about 30 minutes or heated by IR radiation to evaporate the organic solvent of the hard coating composition.

Then, the transparent plastic substrate is irradiated with UV light using a high-pressure mercury lamp or metal halide lamp at about 300 to about 800 mJ/cm$^3$ depending on the wavelength range of UV light to be irradiated.

The photopolymerization initiator produces free radicals upon being irradiated with UV light. The free radicals break double bonds contained in functional groups of the acrylic monomer to initiate a cross-linking reaction. As a result, the hard coating composition is cured on the surface of the transparent plastic substrate to form a final hard coating.

Figure 2:
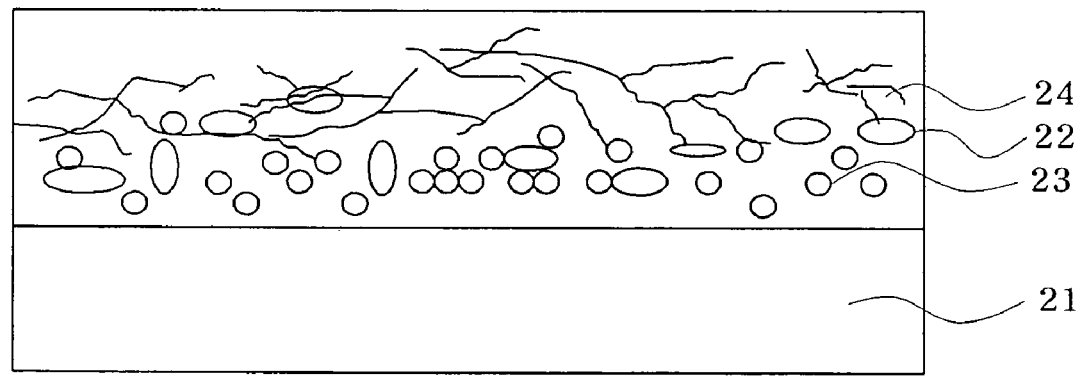
FIG. 2 is a schematic cross-sectional view showing the structure of a transparent hard coating sheet produced by coating with a hard coating composition according to one embodiment.

A transparent hard coating sheet may be provided by the coating method of the hard coating composition. FIG. 2 schematically shows a transparent hard coating sheet according to one embodiment. As shown in FIG. 2, the transparent hard coating sheet includes a transparent plastic substrate 21 and a hard coating formed on the substrate. The hard coating includes an acrylic monomer 22, silver nanoparticles 23 and a conductive filler 24.

The transparent hard coating sheet and its surface hard coating have superior antibacterial properties, anti-fouling functions and anti-static properties, and exhibit improved surface resistivity, transparency, hardness and scratch resistance. Accordingly, the transparent hard coating sheet can be widely applied to protective panels for a variety of display devices, such as LCD panels, PDP panels, electroluminescence displays and field emission displays, interior and exterior panels for cell phones, and protective panels for medical devices. In certain embodiments, the hard coating composition may be used for a coating for rooms inside a building, for example, a clean room for semiconductor processing.

The constitution and effects of the invention will be described in more detail with reference to the following examples. However, these examples are given for the purpose of illustration and are not to be construed as limiting the scope of the invention.

Example 1

An alcoholic solution of poly(3,4-ethylenedioxythiophene)-poly(styrenesulfonate) (PEDT/PSS) as a conductive polymer was placed in a plastic beaker protected from light. Methanol, isopropanol, n-propanol and methylcellosolve as organic solvents were added to the solution with vigorous stirring. The solution was stirred at room temperature for 2 hours to obtain an intermediate solution. To the intermediate solution were added 2-hydroxyethylacrylate (2-HEA available from Japan Catalyst Co., Ltd., Japan) and dipentaerythritol hexacrylate (DPHA available from Satomer, the U.S.A.) and a fluorinated acrylic monomer (available from Dainippon Ink & Chemical Co., Ltd., Japan). The mixture was stirred for about 2 hours.

Separately, silver nanoparticles having an average particle diameter of 1-10 nm were dispersed in a mixture of methanol, isopropanol, n-propanol and methylcellosolve by ultrasonic dispersion or milling. Thereafter, the dispersion was diluted with the organic solvents, and was added to the intermediate solution. A photopolymerization initiator (Darocure 1173) and a light stabilizer (Tinubin 123) were added to the intermediate solution. The resulting mixture was stirred for one hour, and was filtered through a filter (4.5-10 μm) to remove impurities contained therein, completing the preparation of a final hard coating composition. The contents of the components in the hard coating composition are indicated in Table 1. The contents are expressed in weight percentage.

The composition was applied to a 1.0 mm-thick transparent polymethylmethacrylate (PMMA) plastic substrate by flow coating, and was dried using a high-pressure mercury lamp at about 60° C. to about 75° C. for about 5 minutes to completely remove the organic solvents contained in the coating solution. The composition was irradiated with UV light at about 600 mJ/cm$^3$ to produce a transparent hard coating sheet.

Examples 2 to 7 and Comparative Example 1

Hard coating compositions were prepared in the same manner as in Example 1, except that their components and contents thereof were changed as indicated in Table 1. Transparent hard coating sheets were produced using the hard coating compositions in accordance with the procedure described in Example 1.

Comparative Example 2

A transparent hard coating sheet was produced in the same manner as in Example 1, except that a commercially available hard coating composition using an antimony tin oxide (ATO) sol as an antistatic component was used. Specifically, the hard coating composition used herein comprises an antimony tin oxide (ATO) sol as an anti-static conductive agent, 2-hydroxyethylacrylate (2-HEA) and dipentaerythritol hexacrylate (DPHA) as photocurable resins, Darocure 1173 as a photopolymerization initiator, and methanol, isopropanol, n-propanol and methylcellosolve as organic solvents.

Baytron P: Poly(3,4-ethylenedioxythiophene)-poly(styrenesulfonate) Ethanol dispersion, Blue liquid, (available from H.C. Starck, Germany)

MeOH: methanol; IPA: Isopropanol; MC: Methylcellosolve; NPA: n-Propanol

2-HEA: 2-Hydroxyethylacrylate (Japan Catalyst Co., Ltd.)

DPHA: Dipentaerythritol hexacrylate (Satomer)

D-3063: Fluorinated acrylic monomer (Dainippon Ink & Chemical Co., Ltd.)

Darocure 1173: α,α-Dimethoxy-α-hydroxy acetophenone

Tinubin 123: Bis-(1-octyloxy-2,2,6,6-tetramethyl-4-piperidinyl) (Ciba Geigy)

AMS-3000, AMS-5000: Silver nanoparticle sols (available from MIJITECH, Korea)

Test Examples

The physical properties of the transparent hard coating sheets produced in Examples 1 to 7 and Comparative Examples 1 and 2 and surface hard coatings thereof were evaluated in accordance with the following respective procedures.

Evaluation of Physical Properties

Antibacterial functions or bactericidal power were evaluated by culturing *Staphylococcus aureua* and *Esherichia coli* for 24 hours on the coated substrate, and counting the number of surviving bacteria.

Surface resistivity was measured per unit area using a surface resistivity meter (Hiresta available from Mitsubishi Chemical Corp., Japan).

Transmittance was measured using a UV-visible spectrometer.

Pencil hardness was evaluated using a pencil hardness tester (available from Toyoseki, Japan) in accordance with the ASTM D3502.

Scratch resistance was evaluated by reciprocating a load of 1 Kg using a steel wool (#0000) ten times.

Anti-fouling properties: stain guard against oil-based ink maker, fingerprint stain test.

TABLE 1

| Kind | Component | Example No. 1 | 2 | 3 | 4 | 5 | 6 | 7 | Comparative Example No. 1 | 2 |
|---|---|---|---|---|---|---|---|---|---|---|
| Conductive filler | Baytron P | 5 | 4 | 6 | 7 | 8 | 9 | 10 | 5 | |
| ATO | $Sb_2O_5$, $SnO_2$ | | | | | | | | | 2.0 |
| Organic solvents | MeOH | 5 | 5 | 5 | 5 | 5 | 5 | 5 | 5 | 5 |
| | IPA | 8 | 8 | 8 | 8 | 8 | 8 | 5 | 8 | 50 |
| | NPA | 9.9 | 10.4 | 7.9 | 5.9 | 5.9 | 3.9 | 4.9 | 9.9 | 8 |
| | MC | 45 | 45 | 45 | 45 | 45 | 45 | 45 | 46 | 13.9 |
| Photocurable resins | 2-HEA | 4 | 4 | 4 | 4 | 5 | 5 | 5 | 4 | 4 |
| | D-3063 | 5 | 5 | 5 | 5 | 5 | 5 | 5 | 5 | — |
| | DPHA | 15 | 15 | 15 | 15 | 15 | 15 | 15 | 15 | 15 |
| Photopolymerization initiator | Darocure 1173 | 2.0 | 2.0 | 2.0 | 2.0 | 2.0 | 2.0 | 2.0 | 2.0 | 2.0 |
| Light stabilizer | Tinubin 123 | 0.1 | 0.1 | 0.1 | 0.1 | 0.1 | 0.1 | 0.1 | 0.1 | 0.1 |
| Silver nanoparticle sol | AMS-300 | 1.0 | 1.5 | 2.0 | 3.0 | — | — | — | — | — |
| | AMS-5000 | — | — | — | — | 1.0 | 2.0 | 3.0 | — | — |

The obtained results are shown in Table 2 below.

TABLE 2

Physical properties of transparent hard coating sheets

| Example No. | Antibacterial functions (Bactericidal power) | Surface resistivity (ohm/sq.) | Contact angle (anti-fouling) properties | Transmittance (%) | Pencil hardness (H) | Scratch resistance | Appearance |
|---|---|---|---|---|---|---|---|
| Standard specification | ≧90% | <$1.0 \times 10^8$ | — | ≧90% | ≧4H | 10 times | Excellent |
| Ex. 1 | 99.9% | $3.0 \times 10^8$ | 91° | 92.0 | 5H | Good | Excellent |
| Ex. 2 | 99.9% | $6.0 \times 10^8$ | 91° | 92.2 | 5H | Good | Excellent |
| Ex. 3 | 99.9% | $2.0 \times 10^7$ | 91° | 91.9 | 5H | Good | Excellent |
| Ex. 4 | 99.9% | $5.0 \times 10^6$ | 91° | 91.3 | 5H | Good | Excellent |
| Ex. 5 | 99.9% | $4.0 \times 10^6$ | 91° | 91.2 | 5-6H | Good | Excellent |
| Ex. 6 | 99.9% | $1.0 \times 10^6$ | 91° | 91.7 | 5-6H | Good | Excellent |
| Ex. 7 | 99.9% | $8.0 \times 10^5$ | 91° | 91.4 | 5-6H | Good | Excellent |
| Comp. Ex. 1 | 87.2% | $2.0 \times 10^8$ | 91° | 92.1 | 5H | Good | Excellent |
| Comp. Ex. 2 | 87.2% | $5.0 \times 10^9$ | 61° | 90.7 | 4H | Average | Good |

Table 2 shows that the transparent hard coating sheets produced in Examples 1 to 7 and their surface hard coatings exhibit much better antibacterial properties than those produced in Comparative Examples 1 and 2 using no silver nanoparticle sol.

In addition, the transparent hard coating sheets produced using a polythiophene polymer as a conductive filler in Examples 1 to 7 and their surface hard coatings effectively block introduction of moisture in air or impurities from the outside, i.e. exhibit superior anti-fouling functions, and improved surface resistivity, transparency, hardness and scratch resistance, compared to the transparent hard coating sheet produced using ATO in Comparative Example 2 and its surface hard coating.

As apparent from the above description, the hard coating compositions of the embodiments can be used to produce a transparent hard coating sheet that has superior antibacterial properties, anti-fouling functions and antistatic properties, exhibit improved surface resistivity, transparency, hardness and scratch resistance, and produce no pollutants.

Accordingly, the hard coating compositions of the embodiments can be effectively applied to protective filters for a variety of display devices and protective panels for medical devices.

In addition, the hard coating compositions of the embodiments have excellent dispersion stability and storage stability. Furthermore, since the hard coating compositions eliminate the need for frozen storage, they have the advantage of easy transport. Moreover, since the hard coating compositions are inexpensive, it is suitable for commercialization.

Although the embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A composition for coating on a surface, comprising:
   an organic conductive filler;
   a photocurable resin;
   a photopolymerization initiator;
   an organic solvent; and
   a plurality of silver nanoparticles dispersed in the composition,
   wherein the composition has a viscosity of about 5 to 100 cps.

2. The composition of claim 1, wherein the silver nanoparticles have an average diameter of about 1 nm to about 4 nm.

3. The composition of claim 1, wherein the silver nanoparticles have an average diameter of about 6 nm to about 10 nm.

4. The composition of claim 1, wherein at least one of the silver nanoparticles comprises an insulating material coating the surface thereof.

5. The composition of claim 4, wherein the insulating material comprises a silicon-based compound.

6. The composition of claim 5, wherein:
   the silver nanoparticles have an average diameter of about 1 nm to about 10 nm, and
   the silicon-based compound comprises silicon dioxide particles having an average diameter of about 0.1 nm to about 1 nm.

7. The composition of claim 4, wherein the insulating material comprises polyvinylpyrrolidone.

8. The composition of claim 5, wherein the at least one of the silver nanoparticles further comprises a silane coupling agent on the surface thereof.

9. The composition of claim 4, wherein the substantially entire surface of the at least one of the silver nanoparticles is covered with the insulating material.

10. The composition of claim 1, wherein:
    the conductive filler includes one or more of a polyaniline conductive polymer, a polypyrrole conductive polymer, or a polythiophene conductive polymer, and
    the photocurable resin is capable of binding with the conductive polymer of the conductive filler upon curing.

11. The composition of claim 10, wherein the photocurable resin comprises:
    one or more of a monofunctional acrylic monomer, a bifunctional acrylic monomer, or a trifunctional acrylic monomer, and
    one or more of a tetrafunctional acrylic monomer or an acrylic monomer having an acrylic functionality greater than four.

12. The composition of claim 10, wherein the conductive filler is substantially free of metal and metal oxide.

13. An article comprising a coated surface, the coated surface comprising a coated layer, the coated layer comprising:

an organic conductive filler;
a photocurable resin;
a photopolymerization initiator; and
a plurality of silver nanoparticles substantially uniformly dispersed in the layer, at least one of the silver nanoparticles comprising an insulating material coating the surface thereof.

14. The article of claim 13, wherein the insulating material comprises a silicon-based compound.

15. The article of claim 14, wherein:
the silver nanoparticles have an average diameter of about 1 nm to about 10 nm, and
the silicon-based compound comprises silicon dioxide particles having an average diameter of about 0.1 nm to about 1 nm.

16. The article of claim 13, wherein the insulating material comprises polyvinylpyrrolidone.

17. The article of claim 15, wherein the at least one of the silver nanoparticles further comprises a silane coupling agent on the surface thereof.

18. The article of claim 13, wherein the substantially entire surface of the at least one of the silver nanoparticles is covered with the insulating material.

19. The article of claim 13, wherein the article comprises an electronic device.

20. The article of claim 13, wherein the article comprises a coating for rooms inside a building.

21. The article of claim 13, wherein the coated layer has a bactericidal power of about 99% or greater after culturing *Staphylococcus aureua* and *Escherichia coli* for 24 hours on the surface thereof.

* * * * *